United States Patent [19]

Schmidt

[11] 4,039,233

[45] Aug. 2, 1977

[54] CONNECTION APPARATUS FOR MULTIPIECE BEARING RACE

[75] Inventor: Devere W. Schmidt, Comstock Park, Mich.

[73] Assignee: C. L. Frost & Son, Inc., Grand Rapids, Mich.

[21] Appl. No.: 671,721

[22] Filed: Mar. 29, 1976

[51] Int. Cl.² ............................................. F16C 13/00
[52] U.S. Cl. ...................................... 308/195; 301/5.7
[58] Field of Search .............................. 308/190–196; 301/5 R, 5.7

[56] References Cited

U.S. PATENT DOCUMENTS

| | | | |
|---|---|---|---|
| 1,375,019 | 4/1921 | Sellew | 308/195 |
| 3,103,387 | 9/1963 | Saxenberg | 301/5.7 |
| 3,360,314 | 12/1967 | Di Loreto | 301/5.7 |

Primary Examiner—Joseph F. Peters, Jr.
Assistant Examiner—Gene A. Church
Attorney, Agent, or Firm—Price, Heneveld, Huizenga & Cooper

[57] ABSTRACT

The specification discloses a multipiece assembly forming a race for a bearing assembly including a resilient retainer located between mating first and second race-forming members for retaining said members together. The retainer provides simplified assembly and secure retention of the members and allows the members to be tightened together such that they function as an integral unit. In the preferred form, the retainer is a resilient, memory-retaining, split-ring clip received completely internally within the assembly in registering grooves in the mating first and second members of a raceway assembly for a bearing, especially an inner raceway assembly.

25 Claims, 7 Drawing Figures

CONNECTION APPARATUS FOR MULTIPIECE BEARING RACE

BACKGROUND OF THE INVENTION

This invention relates to bearing assemblies for supporting wheels, pulleys, and other rotating members, and, more particularly, to a multipiece bearing race assembly and retainer or connection means for retaining the various portions of the race assembly together.

The assembly of various portions of a bearing race to provide a stable, wear-resistant, bearing assembly has long been a problem in the industry. In the typical bearing, a full or partial complement of ball bearings or bearing rollers is positioned between inner and outer races which confine the balls or rollers to move in an annular, generally planar path to allow movement between the respective inner and outer races. Since such inner and outer races must adequately confine the balls or rollers, means providing access to the raceway interior through the confining structure must be provided to load the balls or rollers. Prior assemblies have included an opening in the side of the bearing approximating the size of the balls or rollers which are forced therethrough into the raceway, a split outer ring which is pulled apart for loading and allowed to snap back following loading, or an inner or outer raceway manufactured in several pieces which can be assembled in succession during which the balls or rollers are loaded therein.

The use of multipiece races, either inner or outer, provides significant problems in retaining the various pieces together over the life of the bearing. Thus, prior structures have included a third member which is swaged or otherwise permanently joined to the exterior of the various pieces; a washer at the side of the ball bearings or rollers serving as a shield without touching the balls or rollers; reliance on other external pieces adjacent the multipiece assembly to retain the two together; or a split flange in one of the pieces and received by the other. An example of the latter structure is shown in U.S. Pat. No. 3,360,314 to E. G. Di Loreto. In Di Loreto, retention of the multipieces together directly depends on the size, configuration, and material resiliency in the elements to be joined. Thus, in Di Loreto, it is necessary to use thin-walled, resilient material to form its inner race to provide necessary flexing to join the parts. Such structure is also expensive to manufacture because of the necessity of precise milling or other machining of the parts to be joined. Further, those assemblies which rely on other external support for retention of the various parts cannot be shipped as a unit without special packaging or other precaution to keep the assemblies together.

In another prior structure, as shown in U.S. Pat. No. 1,093,348 to L. P. Mooers, a retaining ring forms a part of the inner race which is held in place on a surface of another portion of the inner race by an annular, soft metal wire ring fitted in a groove between the surface and retaining ring after all the remaining parts are assembled. This assembly requires the groove in which the soft metal ring is seated to be precisely and carefully positioned in the two parts which are held together so that the inner race will be in proper relationship to the ball. This increases manufacturing expense and difficulty. No provision is made for preventing the retaining ring from rotation with the other portion of the inner race thus allowing increased wear. The soft metal of the wire ring also is easily susceptible to wear, stress, and pressure during use of the bearing.

The present invention overcomes the above problems by providing a simple, inexpensive, and reliable connection apparatus for joining melting pieces of multipiece bearing assemblies in a manner allowing simple assembly and secure retention of the various pieces.

SUMMARY OF THE INVENTION

Accordingly, the present invention is a multipiece bearing race assembly especially useful for inner race assemblies wherein mating members of the multipiece race are retained together by retainer means located entirely between the joined members in registering receiving means. The configuration of the retainer means is changed as the members are assembled until the receiving means are brought into registry and the retainer returns to its original configuration to securely lock the members together. Further, the connection apparatus is hidden between the joined members and a predetermined portion of the retainer means allows the joined members to be independently axially adjusted without stressing the retainer means. In the preferred form, the members are forced tightly together so that they function as a complete, integral unit to prevent rotation therebetween without reliance upon the retainer means when the multipiece race is assembled with other apparatus in which the bearing assembly is used.

In the preferred form, the invention includes a resilient, memory-retaining, partially closed, retainer clip received in corresponding receiving grooves formed in the joined members. Preferably, the receiving grooves lie generally transverse to the axis of the joined members with the clip being partially retained in each. One portion of the groove is wider than the retainer clip to allow the joined members to be tightly forced together. During assembly, the clip is placed on one member, and is forced or cammed entirely into the groove on that one member by a camming surface on the other member until the grooves are brought into registry. The clip then snaps back to extend between the grooves for retention of the members.

Provision of the retainer means as a separate clip provides much greater flexibility for connecting bearing pieces than prior known structures. Its operation does not depend on the shape, size, or resiliency of the joined members. Thus, the joined members can be constructed and configured as necessary, i.e., thick, solid, thin, rigid, or resilient, while the connection apparatus itself performs the joining function. Moreover, rotation between the joined members is avoided, assembly of the various members is simplified, and the various parts stay together during transportation and storage.

These and other objects, advantages, purposes, and features of the invention will become more apparent from a study of the following description taken in conjunction with the drawings.

DESCRIPTION OF THE PREFERRED EMBODIMENT

Figure 1:
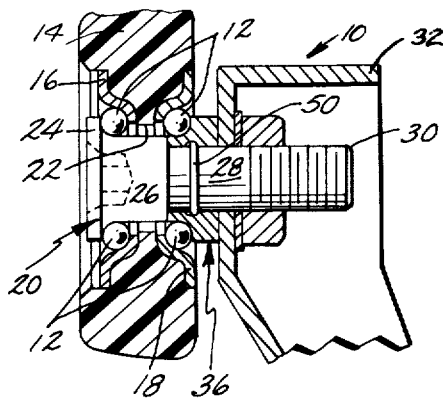
FIG. 1 is a sectional side elevation of a trolley wheel assembly including a multipiece inner race assembly including the connection apparatus of the present invention.

Referring now to the drawings in greater detail, FIGS. 1-4 illustrate a multipiece inner race assembly 10 for bearings in which the various mating portions thereof are retained together by the connection apparatus of the present invention. Bearing assembly 10 includes double rows of ball bearings seated between the inner and outer races, each row including a full complement of ball members 12. Specifically, assembly 10, except for the inclusion of the connection apparatus of the present invention, is a trolley wheel assembly of the type described in detail in copending U.S. patent application Ser. No. 528,794, filed Dec. 2, 1974, invented by Frederick R. Sytsma, entitled SANITARY ANTI-FRICTION TROLLEY WHEEL, now U.S. Pat. No. 3,971,601, which is incorporated by reference herein. Of course, other trolley wheel assemblies may also be used with the present invention.

As shown in FIG. 1, bearing assembly 10 includes a trolley wheel 14 formed either from an acetal resin such as "Delrin" sold by I. E. DuPont de Nemours and Company or ultra-high molecular weight plastic material in the desired shape and having the desired outer circumferential configuration. A pair of spaced, axially aligned, stamped metallic outer race discs 16 and 18 including portions formed in the configuration of the ball members 12 are secured in appropriately formed recesses adjacent either side of the wheel 14. A generally cylindrical, solid shaft or stud 20 extends through central aperture 22 formed through wheel 14 providing both an axle for the wheel 14 and an inner race for at least one of the two rows of ball members 12. The inner raceway provided by stud 20 is formed by an enlarged head portion 24 flaring inwardly in an annular, circular contour matching that of ball members 12 to a shank portion 26 extending the majority of the way through aperture 22.

Figure 2:
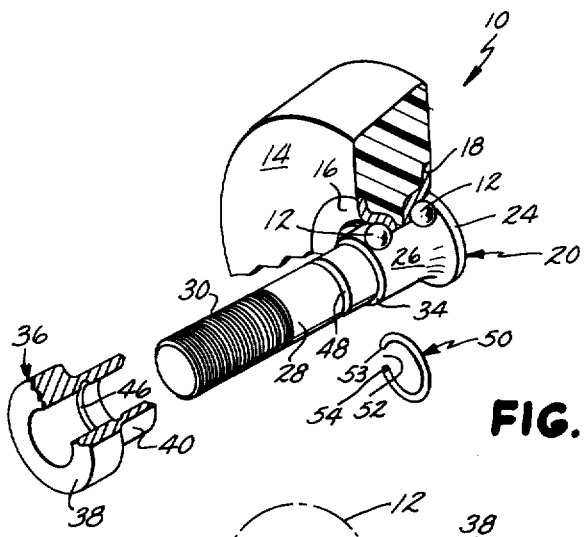
FIG. 2 is an exploded, fragmentary, perspective view of the trolley wheel assembly of FIG. 1 illustrating the separate elements of one form of the invention.

Extending concentrically from the end of shank portion 26 is a cylindrical stud extension 28 having its outer end portion 30 threaded for the attachment of the entire assembly to a supporting bracket 32 or the like by appropriate fasteners such as nut and washer, as illustrated in FIG. 1. Extension 28 has a reduced diameter from that of shank portion 26 providing an annular shoulder 34 lying in a plane generally transverse to the longitudinal axis of stud or axle member 20 (FIGS. 2-4).

Telescoped over the end 30 of stud 28 is an annular collar member 36 including an enlarged head portion 38 curving inwardly in conformance to the contour of the ball members to be engaged thereby to a reduced diameter portion 40. The transition between the head 38 and portion 40 provides a circular contour forming the inner raceway receiving the second row of ball members 12 as shown in FIG. 1. Collar member 36 includes a circular aperture 42 extending therethrough having a diameter closely matching that of stud 28 to prevent wear on the stud. The outer diameter of portion 40 corresponds to the diameter of shank portion 26 such that a flush, continuous surface is provided across the extent of the inner race between the curved contours receiving ball members 12 and the larger diameter head portions 24, 38. The end edge 44 of collar 36 abuts shoulder 34 in tight, binding engagement.

The essence of the invention lies in the retention of annular collar 36 on stud member 20. Such retention is accomplished by providing an annular groove 46 within aperture 42 of collar 36 somewhere along the length of the aperture between end surfaces 43, 44 of the collar (FIGS. 3-4). A mating inner groove 48 is provided about the circumference of extension 28 such that grooves 46, 48 will be in registry approximately when end surface 44 of collar 36 abuts shoulder 34 of stud 20. A resilient, memory-retaining, partially closed, split ring clip 50 is provided for insertion in the receiving grooves 46, 48. Preferably split ring 50 is circular in cross section and has a normal diameter corresponding to the width of at least one of the receiving grooves. Preferably, its diameter matches the width of the inner groove 48 in stud 28 while groove 46 has a slightly larger width as explained below. Groove 46 has a depth equivalent to approximately one-half of the diameter of the ring 50. Accordingly, ring 50 typically extends halfway into each of grooves 46, 48 to restrain axial movement of collar 36 on stud 20 (FIG. 4).

Figure 3:
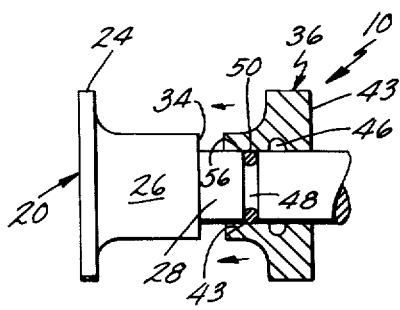
FIG. 3 is a fragmentary, side elevation, shown partially in cross section, illustrating the inner race assembly of FIGS. 1 and 2 when partly assembled.
Figure 4:
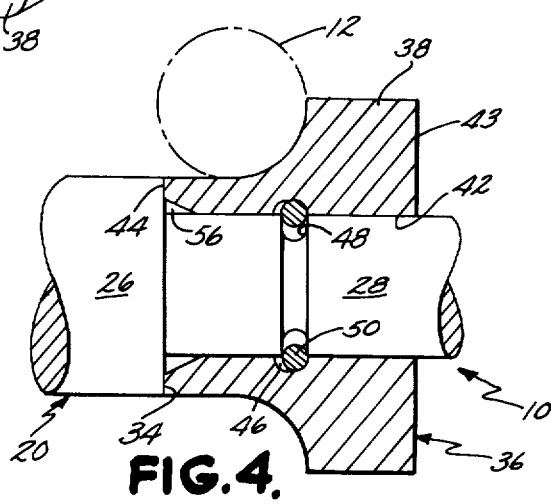
FIG. 4 is an enlarged, fragmentary, side elevation, shown partially in cross section, illustrating the inner race assembly of FIGS. 1-3 when completely assembled.

As shown in FIG. 3, assembly of collar 36 over extension 28 is accomplished by providing groove 48 with a depth sufficient to receive the entirety of split ring 50 without any portion protruding above or beyond the outer circumferential surface of extension 28. Ring 50 is first inserted in one of the grooves 46 or 48 on one of the members as a subassembly. Preferably, the ring is placed first in groove 48. After shaft 20 is inserted partially through aperture 22 in wheel 14 and the left-hand row of ball members 12 is loaded (FIG. 1), the right-hand row of ball members is placed in outer race 18. Collar 36 is then telescoped over extension 28. An inclined or beveled, annular camming surface 56 is formed at the mouth of aperture 42 in collar 36 where it opens at end surface 44. Surface 56 engages the normally expanded split ring 50 and cams it downwardly and inwardly thereby compressing it into the depth of groove 48. Continued axial movement of collar 36 toward shoulder 34 engages end surface 44 with shoulder 34 and brings grooves 46, 48 into registry such that the resilient clip 50 snaps back to its original configuration and retains the inner race members 20, 36 together.

Figure 5:
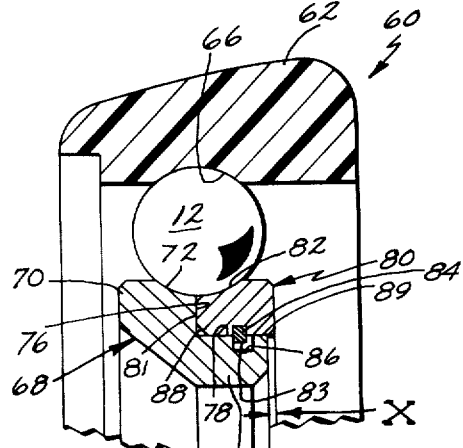
FIG. 5 is a fragmentary, sectional, side elevation of a second type of bearing assembly including the connection apparatus of the present invention.

Split ring or clip member 50 is preferably formed from heat-treated steel wire or other metallic material although materials such as Delrin could also be used. It includes a memory and sufficient resiliency to move outwardly into position between the grooves when grooves 46, 48 are in registry. The ring is formed in the shape of a partial circle including an open space 52 between free ends 53, 54 of the ring (FIG. 2). Open space 52, together with the natural resiliency of the heat-treated material, allows the clip to be compressed and have its configuration changed and preferably reduced or compressed by the camming action of collar 36. Although clip 50 is shown with a circular cross section, it may also be used with a square or rectangular cross section (FIG. 5). Further, it may be formed in the overall shape of a partial square or rectangle or any other configuration in order to match the configurations of grooves 46, 48.

As is seen in FIG. 4, in order to allow collar 36 to be tightly engaged against shoulder 34, at least one of the grooves 46, 48 and preferably outer groove 46 in collar 36 is provided with a width slightly greater than the diameter or cross-sectional width of clip or spring retainer 50. Accordingly, when retainer 50 is expanded between the grooves 46, 48, a slight amount of axial movement is allowed. When a bracket or other supporting apparatus such as that shown at 32 in FIG. 1 is abutting against the outer surface 43 of collar 36, collar 36 can be moved tightly against shoulder 34 without stressing, bending, or otherwise deforming or squeezing the retainer ring 50. Hence, stud 20 and collar 36 can be tightly engaged to function as a complete, integral, inner race unit providing a secure seat for the rows of ball members 12 without stressing or burdening the retaining apparatus including retainer ring 50. Thus, the dimensions of the collar 36 and stud 20 are relied upon for positioning the raceways which receive balls 12 not the retainer clip or the positions of grooves 46, 48. Such tight engagement also prevents rotation of collar 36 with respect to shoulder 34 and stud 20 thereby avoiding wear and consequent loosening of the parts. However, when the assembly 10 is removed from a support bracket 32, the full complement of ball members 12 in each row will be retained in the assembly because collar 36 will be retained on extension 28 by retaining ring 50. Transportation and storage of the assembled bearings until their use is required is convenient and efficient.

Preferably, the walls of grooves 46, 48 are formed parallel to one another such that there is vertical abutment between ring 50 and the walls of the grooves. This configuration resists removal of the collar 36 from stud 28 once it has been telescoped into proper position via camming surface 56.

Referring to FIG. 5, bearing assembly 60 is a second type of bearing including a single, full complement row of ball members. In this form, the connection apparatus is shown joining mating portions of an inner race assembly while the circumferentially outer metallic wheel 62 provides the outer race. Wheel 62 has a shallow, curved, annular groove 66 formed intermediate the side surfaces of wheel 62 within central aperture 64 extending therethrough. Groove 66 provides the outer raceway for the single, full complement row of spherical ball bearing members 12. The inner raceway includes an annular member 68 having a larger diameter portion 70 at one end which includes a curved, annular, inner raceway forming groove portion 72 formed on its outer circumference. A reduced diameter portion 74 formed at the opposite end of annular member 68 provides a shoulder 76 extending generally transverse to the axial direction of assembly 60.

Telescoped over the outer circumferential cylindrical surface 78 of reduced diameter portion 74 is a second inner race annular member 80 also including a curved, annular groove 82 corresponding in shape to the outer surface of ball members 12. Groove 82 mates with groove 72 to form a complete, shallow inner race groove for receipt of the ball members.

Annular member or collar 80 is retained on annular member 68 by a split ring connector clip 83 received in a correspondingly shaped groove 84 formed in the inner diameter of member 80 and a registering groove 86 formed in the outer surface of reduced diamter portion 74. Split ring 83 is similar in all respects to ring 50 except that it is of a rectangular or square, cross-sectional shape as seen in FIG. 5. Groove 86 has a sufficient depth to receive the entirety of ring 83 when member 80 is telescoped over reduced diameter portion 74 as well as a width slightly greater than that of the ring to allow slight axial movement of collar 80 on member 68 and tight, binding engagement between end surface 81 of member 80 and shoulder 76 of annular member 68. As with bearing assembly 10, annular member 80 includes an inclined or beveled camming surface 88 between end surface 81 and the inside surface of the collar 80 facilitating compression of retaining ring 83 during assembly of the inner race members. Further, collar 80 is slightly wider than the width of reduced diamter portion 74. Collar 80 thus extends a distance X (FIG. 5) beyond member 68 providing an exterior surface 89 which can be freely engaged by a bracket or other supporting apparatus to tightly engage mating surfaces 81 and shoulder 76 to prevent rotation and stress as mentioned with assembly 10.

Bearing 60 is assembled by first inserting clip 83 in groove 86 on member 68 and loading ball members 12 between wheel 62 and member 68. Thereafter, collar 80 is telescoped over portion 74 of member 74 with split ring or clip 83 being cammed into and received by grooves 84, 86 in the above-described manner. The retainer assembly does not detract from or cause misalignment of the concentricities of members 68, 80 because it allows self-alignment.

Figure 6:
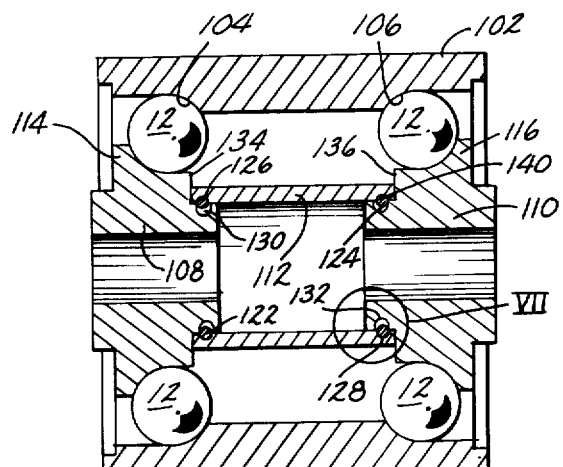
FIG. 6 is a sectional, side elevation of a third type of bearing assembly including the connection apparatus of the present invention.

FIG. 6 illustrates yet another form of bearing assembly 100 including double rows of ball members 12. Each row includes a full complement of ball members or rollers received between a one-piece outer race member 102 and a multipiece inner race assembly retained together via the present invention. The outer race member 102 includes a pair of spaced annular, curved grooves 104, 106 providing outer raceways for confining ball members 12 (FIG. 6). Ball members 12 are retained in the outer raceway member by a pair of inner race members 108, 110 interconnected by a cylindrical, spacer sleeve 112. Inner raceway members 108, 110 include annular, enlarged-diameter portions 114, 116 respectively, each of which include a curved, inwardly facing, annular groove 118, 120. Each groove 118, 120 provides an inner raceway for one of the rows of ball members 12.

Inner raceway members 108, 110 are retained on spacer 112 by means of resilient, split ring connector clips 122, 124 received in registering grooves formed in spacer 112 and raceway members 108, 110. Spacer 112 includes annular grooves 126, 128 spaced apart from one another adjacent either end of the spacer. Inner raceway members 108, 110 include grooves 130, 132 which register with grooves 126, 128 and are formed in the outer circumferential surfaces of reduced diameter portions thereof which are received within the inner diameter of the spacer 112. Accordingly, the end surfaces of spacer 112 abut shoulders 134, 136 on the respective inner race members 108, 110 such that members 108, 110, and 112 can be tightly engaged together to retain the three pieces as a single, integral, inner race assembly for confinement of the double rows of ball bearings without wobble or wear.

Figure 7:
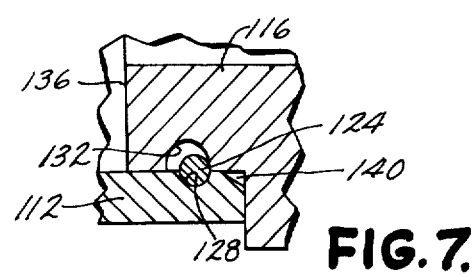
FIG. 7 is an enlarged, fragmentary, sectional view of area VII of FIG. 6.

As with assemblies 10 and 60, one of the grooves in each mating and registering pair has a depth sufficient to receive the entire retainer ring 122, 124 when the members are telescoped together. Further, one of the grooves in each mating pair has a slightly greater width than the cross-sectional width of the retainer rings 122, 124 to allow slight axial movement of members 114, 116 with respect to spacer 112 providing tight engagement between the end surfaces of spacer 112 and the shoulders 134, 136. Preferably, in embodiment 100, grooves 130, 132 are deep enough to receive the entireties of clips 122, 124 respectively, and are also slightly wider than the clips to allow the slight axial movement (FIG. 7). Each inner end edge of spacer 112 has an annular, inclined or beveled camming surface 138, 140 to facilitate compression of rings 122, 124 during telescoping assembly of the inner race.

Assembly of embodiment 100 includes telescoping member 108 into one end of spacer 112, and inserting that assembly through outer race 102 while loading the left-hand row of ball members 12 as shown in FIG. 7. The right-hand row of ball members is placed in outer race 102 and member 116 is telescoped onto spacer 112 to confine the rows while retainer clips 122, 124 keep the assembly together. A shaft can be inserted through the central apertures in members 108, 110 to secure the assembly in a larger apparatus as desired and to draw shoulders 134, 136 tightly against the ends of spacer 112 to form a wear-free inner race assembly.

Accordingly, it will be appreciated that the present invention allows assembly and retention of multipiece raceway assemblies for bearing units in either inner or outer raceway assemblies. Typically, the resilient retainer rings are seated on the smallest diameter portion of the members to be retained together after which the members are telescoped together causing compression of the ring. After assembly, the clips snap back to retain the various portions together in their normal configuration. The retainer clips can also be placed in the larger diameter outer grooves of sufficient depth to receive the entire clip such that the clips are expanded during assembly. In either case, however, the retention apparatus is located intermediate the race members to avoid protruding structure and allow compact assembly and flush abutment with brackets, supports, and other apparatus.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A multipiece race assembly for receiving a bearing member comprising a first means having an axis therethrough for forming a portion of the race assembly; second means received by at least a portion of said first means in axial alignment with said first means for forming another portion of the race assembly; at least one of said means forming at least a portion of a raceway for a bearing member; and retainer means received on one of said means and located between said first and second means for retaining said second means on said first means; said retainer means including means for allowing slight axial movement between said first and second means to allow independent axial adjustment of said first and second means without stressing said retainer means.

2. The assembly of claim 1 wherein said retainer means includes at least one resilient retainer clip and receiving means on said first and second means for receiving said clip.

3. The assembly of claim 2 wherein said receiving means includes a groove on said first means lying generally transverse to said axis of said first means.

4. The assembly of claim 3 wherein said receiving means further includes a second groove on said second means adapted to be in registry with said groove on said first means when said second means is received on said first means.

5. The assembly of claim 4 wherein said retainer clip is a partially closed, loop of resilient, memory-retaining material received at least partially in each of said grooves.

6. The assembly of claim 4 wherein said groove on one of said first and second means is deeper than said other groove and has a depth sufficient to receive said retainer clip in its entirety; said clip being normally received at least partially in each of said grooves except during assembly of said first and second means when the configuration of said ring is changed by engagement with one of said means such that said ring is forced completely into said deeper groove until said grooves are brought into registry.

7. The assembly of claim 1 including camming means on at least one of said first and second means for changing the configuration of said retainer means during assembly of said means together, said retainer means having sufficient resiliency and memory to return to its original configuration following assembly.

8. The assembly of claim 7 wherein said camming means include an inclined surface on one of said first and second means.

9. The assembly of claim 7 wherein said first and second means are generally cylindrical inner race members; said second means including a cylindrical aperture therethrough and a flange having at least a portion of its surface configured to correspond to the shape of the bearing member adapted to be received thereby; said retainer means including a partially closed, resilient, split ring, connector clip, a first clip-receiving groove on said first means, and a second clip-receiving groove in said aperture on said second means; said camming means including an annular bevel at the mouth of said aperture on said second means.

10. The assembly of claim 1 wherein at least one of said first and second means includes a shoulder for abutting the other means when said means are assembled; said retainer means including a resilient spring clip and a groove in each of said means for receiving said clip; said means providing slight axial movement including the groove in at least one of said first and second means being slightly wider than the thickness of said clip to provide said slight axial movement.

11. A bearing assembly comprising outer race means providing an outer race for at least one row of bearing members; inner race means for receiving and confining said one row of bearing members in cooperation with said outer race means; said inner race means including a first member having an axis extending therethrough; a second member received by at least a portion of said first member in axial alignment with said first member; said first member including at least a first groove lying generally transverse to said axis; said second member including a second groove adapted to register with said first groove when said second member is received by said first member; and resilient retainer means received at least partially in each of said grooves for retaining said second member on said first member; said retainer means including means allowing slight axial movement between said members to allow said members to be securely tightened together without stressing said retainer means whereby said first and second members function as a complete unit without reliance on said retainer means.

12. The assembly of claim 11 wherein said retainer clip is a partially closed loop of resilient, memory-retaining material received at least partially in each of said grooves.

13. The assembly of claim 12 wherein said groove on one of said members is deeper than said other groove and has a depth sufficient to receive said retainer clip in its entirety; said clip being normally received at least partially in each of said grooves except during assembly of said first and second members when the configuration of said ring is changed by engagement with one of said members such that said ring is forced completely into said deeper groove until said grooves are brought into registry.

14. The assembly of claim 11 including camming means on at least one of said first and second members for changing the configuration of said retainer means during assembly of said members together, said retainer means having sufficient resiliency and memory to return to its original configuration following assembly.

15. The assembly of claim 14 wherein said camming means include an inclined surface on one of said first and second members.

16. The assembly of claim 14 wherein said first and second members are generally cylindrical inner race members; said second member including a cylindrical aperture therethrough and a flange having at least a portion of its surface configured to correspond to the shape of the bearing member adapted to be received thereby; said retainer means including a partially closed, split ring, connector clip, a first clip-receiving groove on said first member, and a second clip-receiving groove in said aperture on said second member; said camming means including an annular bevel at the mouth of said aperture on said second member.

17. The assembly of claim 11 wherein at least one of said first and second members includes a shoulder for abutting the other member when said members are assembled; said retainer means including a resilient spring clip and a groove in each of said members for receiving said clip; said means allowing slight axial movement including the groove in at least one of said members being slightly wider than the thickness of said clip to provide said slight axial movement.

18. A trolley wheel assembly comprising a wheel having a central opening; means defining an annular, outer bearing race means about said opening; means defining at least a portion of an inner race means spaced from said outer race means; an axial means extending through said opening for supporting said inner race means; a plurality of antifriction means disposed in said space defined between said inner and outer race means; and retainer means receivable on at least one of said axial means and inner race means and located therebetween for retaining said axial means and inner race means together; said retainer means including means allowing slight axial movement between said axial means and inner race means to allow said axial means and inner race means to be securely tightened together without stressing said retainer means whereby said axial means and inner race means function as a complete unit without reliance on said retainer means.

19. The trolley wheel assembly of claim 18 wherein said inner race means is an annular member; said axial means including a member having a cylindrical portion; said annular member being received in axial alignment by said cylindrical portion.

20. The trolley wheel assembly of claim 18 wherein said retainer means includes clip means for engaging said axial means and inner race means and receiving means on at least one of said axial means and inner race means for receiving said clip means and retaining said clip means in engagement with said axial and inner race means.

21. The trolley wheel assembly of claim 20 wherein said clip means include a partially closed, resilient, split connector clip; said receiving means including a first clip-receiving groove on said axial means and a second clip-receiving groove on said inner race means.

22. The trolley wheel assembly of claim 21 wherein one of said first and second clip-receiving grooves has a depth sufficient to receive the entirety of said clip when its configuration is changed during assembly of said axial and inner race means.

23. The trolley wheel assembly of claim 22 wherein one of said axial and inner race means includes camming means for changing the configuration of said clip during assembly.

24. The trolley wheel assembly of claim 21 wherein said means allowing slight axial movement include one of said grooves being wider than said clip to allow slight axial movement between said axial means and inner race means for tightening into an integral unit without reliance on said retainer means.

25. A trolley wheel assembly comprising a wheel having a central opening; means defining an annular, outer bearing race means about said opening; means defining at least a portion of an inner race means spaced from said outer race means; an axial means extending through said opening for supporting said inner race means; a plurality of antifriction means disposed in said space defined between said inner and outer race means for rotatably supporting said race means with respect to one another; retainer clip means for engaging said axial means and inner race means; and receiving means on at least one of said axial means and inner race means for receiving said retainer clip means and retaining said retainer clip means in engagement with said axial and inner race means; said retainer clip means including a partially closed, resilient, connector clip; said receiving means including a first clip-receiving groove on said inner race means; at least one of said axial and inner race means including camming means for changing the configuration of said clip during assembly and at least one of said first and second clip-receiving grooves having a depth sufficient to receive the entirety of said clip when its configuration is changed during assembly of said axial and inner race means.

* * * * *